(12) United States Patent
Qiu et al.

(10) Patent No.: US 8,120,504 B2
(45) Date of Patent: Feb. 21, 2012

(54) CIRCUIT FOR INDICATING OPERATING STATUS OF COMPUTER HARDWARE DEVICES

(75) Inventors: Xun-Chun Qiu, Shenzhen (CN); Guang-Dong Yuan, Shenzhen (CN); Chung-Chi Huang, Taipei Hsien (TW); Rong Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 717 days.

(21) Appl. No.: 12/340,754

(22) Filed: Dec. 22, 2008

(65) Prior Publication Data
US 2010/0141462 A1 Jun. 10, 2010

(30) Foreign Application Priority Data
Dec. 4, 2008 (CN) .............................. 200810305966

(51) Int. Cl.
*G08B 21/00* (2006.01)
(52) U.S. Cl. ......... 340/653; 340/538; 340/3.1; 340/656; 340/638; 340/652; 361/63; 361/65; 361/86; 361/104

(58) Field of Classification Search .................. 340/653, 340/3.1, 656, 538, 638, 652; 710/1; 307/66; 361/63, 65, 86, 104; 348/106, 754
See application file for complete search history.

(56) References Cited

U.S. PATENT DOCUMENTS

| | | | | |
|---|---|---|---|---|
| 5,488,572 A | * | 1/1996 | Belmont | 710/62 |
| 5,634,137 A | * | 5/1997 | Merkin et al. | 710/10 |
| 6,128,672 A | * | 10/2000 | Lindsley | 710/19 |
| 6,948,020 B1 | * | 9/2005 | Bonomo et al. | 710/300 |
| 7,426,592 B2 | * | 9/2008 | Chen | 710/104 |
| 2005/0050232 A1 | * | 3/2005 | Yoshioka | 710/1 |
| 2007/0228835 A1 | * | 10/2007 | Varzhabedian | 307/66 |
| 2007/0234124 A1 | * | 10/2007 | Chen | 714/36 |
| 2010/0003047 A1 | * | 1/2010 | Achiwa | 399/85 |

* cited by examiner

*Primary Examiner* — Hoi Lau
(74) *Attorney, Agent, or Firm* — Altis Law Group, Inc.

(57) ABSTRACT

A circuit for indicating operating status of a plurality of hardware devices of a computer includes a detecting module, a decoding module, and an indicating module. The indicating module includes a dual color indicator and two electronic switches connected to a first input and a second input of the dual color indicator respectively. The detecting module detects an operating status of the plurality of hardware devices, and outputs state signals of each hardware device during power on self test of the computer. The decoding module decodes the state signals, and outputs level control signals to turn on or off the two electronic switches. The dual color indicator indicates operating status of the plurality of hardware devices by shifted to be at different indicating states by the two electronic switches correspondingly.

20 Claims, 3 Drawing Sheets

CIRCUIT FOR INDICATING OPERATING STATUS OF COMPUTER HARDWARE DEVICES

BACKGROUND

1. Technical Field

Embodiments of the present disclosure relate to indicating circuits, and particularly to a circuit for indicating operating status of computer hardware devices.

2. Description of the Related Art

A computer system may have two status lights on the front panel of the computer system to indicate power and hard disk drive (HDD) activity. The status lights are generally two light emitting diodes (LEDs). Both the LEDs emit light to indicate that the power supply and the HDD of the computer system work normally for convenient monitoring of the status of the power supply and the HDD. However, to indicate status of many other hardware devices, such as computer memory, video cards, and system buses in this manner, requires additional lights and reconfiguration of the computer enclosure which is costly.

What is needed, therefore, is to provide a circuit for indicating status of computer hardware devices to overcome the above-mentioned shortcoming.

DETAILED DESCRIPTION

Figure 1:
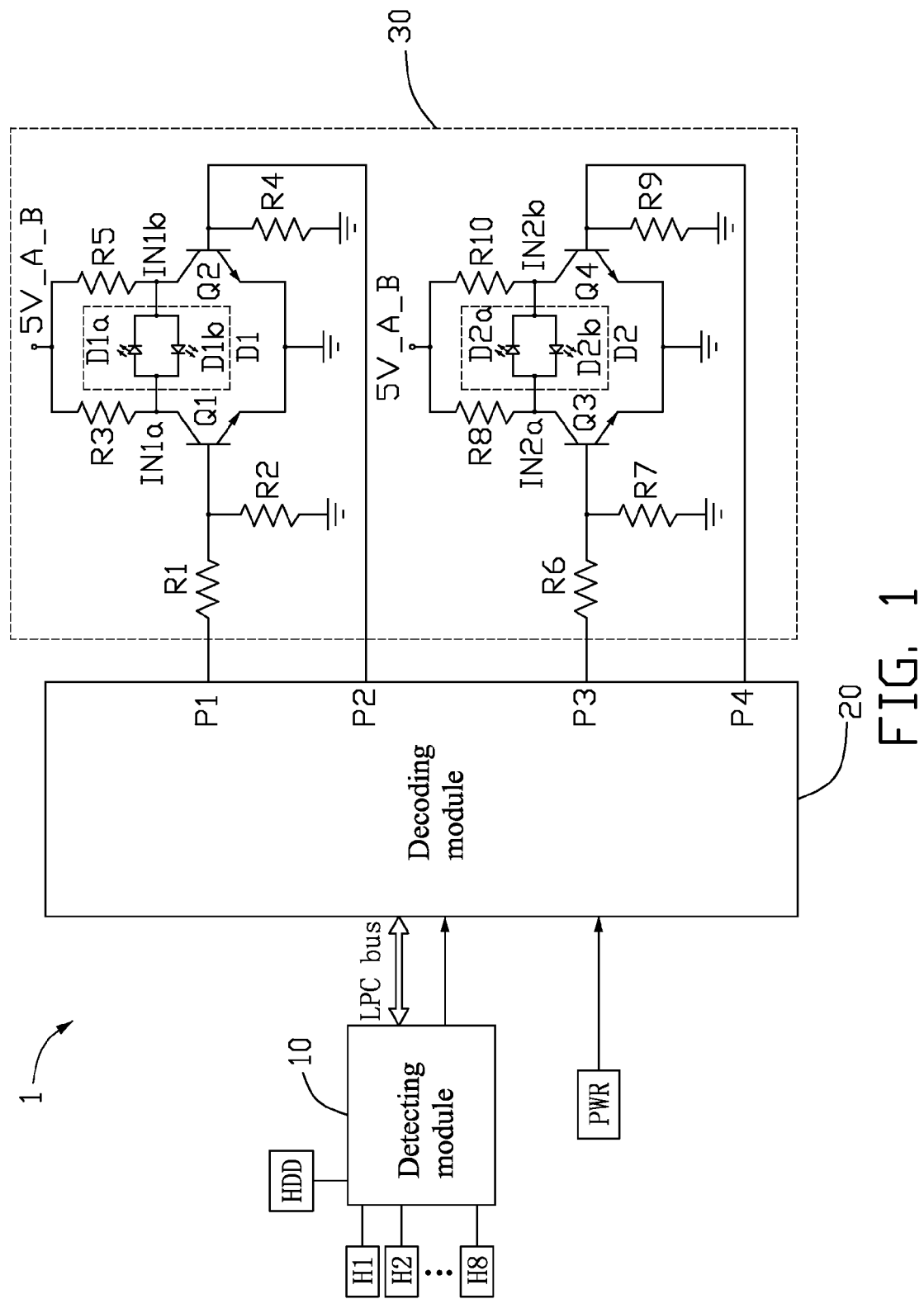
FIG. 1 is a circuit diagram of a first embodiment of a circuit for indicating status of computer hardware devices.

Referring to FIG. 1, a first embodiment of a circuit 1 is disclosed for indicating operating status of a plurality of hardware devices H1-H8 of a computer (not shown) during a power on self test (POST) of the computer, and indicating operating status of a hard disk drive HDD and a power supply PWR of the computer after the POST. The circuit 1 includes a detecting module 10, a decoding module 20, and an indicating module 30 connected in series.

In one embodiment, the detecting module 10 may be a south bridge chip of the computer. The decoding module 20 may be a complex programmable logic device (CPLD) or a micro controller unit (MCU). The detecting module 10 is connected to the plurality of hardware devices H1-H8 of the computer via a low pin count (LPC) bus. The decoding module 20 includes four output pins P1-P4 connected to the indicating module 30. The decoding module 20 is also connected to the power supply PWR of the computer. The plurality of hardware devices H1-H8 may be computer memory, video cards, central processing units (CPUs), or other key hardware devices of the computer.

The indicating module 30 includes two dual color indicators D1, D2, four electronic switches Q1-Q4, and a plurality of resistors R1-R10. In the illustrated embodiment, the electronic switches Q1-Q4 are NPN transistors. The dual color indicator D1 includes two light emitting diodes (LEDs) D1a and D1b. The dual color indicator D2 includes two LEDs D2a and D2b. The LEDs D1a and D2a can emit green light, while the LEDs D1b and D2b can emit blue light.

The base of the electronic switch Q1 is connected to the output pin P1 of the decoding module 20 via the resistor R1, and is grounded via the resistor R2. The collector of the electronic switch Q1 is connected to a power supply 5V_A_B via the resistor R3 The anode of the LED D1a and the cathode of the LED D1b are connected to function as a first input IN1a of the dual color indicator D1. The cathode of the LED D1a and the anode of the LED D1b are connected to function as a second input IN1b of the dual color indicator D1. The first input IN1a of the dual color indicator D1 is connected to the collector of the electronic switch Q1. The base of the electronic switch Q2 is connected to the output pin P2 of the decoding module 20, and is grounded via the resistor R4. The collector of the electronic switch Q2 is connected to the second input IN1b of the dual color indicator D1, and is connected to the power supply 5V_A_B via the resistor R5.

The base of the electronic switch Q3 is connected to the output pin P3 of the decoding module 20 via the resistor R6, and is grounded via the resistor R7. The collector of the electronic switch Q3 is connected to the power supply 5V_A_B via the resistor R8. The anode of the LED D2a and the cathode of the LED D2b are connected to function as a first input IN2a of the dual color indicator D2. The cathode of the LED D2a and the anode of the LED D2b are connected to function as a second input IN2b of the dual color indicator D2. The first input IN2a of the dual color indicator D2 is connected to the collector of the electronic switch Q3. The base of the electronic switch Q4 is connected to the output pin P4 of the decoding module 20, and is grounded via the resistor R9. The collector of the electronic switch Q4 is connected to the second input IN2b of the dual color indicator D2, and is connected to the power supply 5V_A_B via the resistor R10. The emitters of the electronic switches Q1-Q4 are grounded.

The bases of the electronic switches Q1-Q4 function as inputs of the electronic switches Q1-Q4 correspondingly. The collectors of the electronic switches Q1-Q4 function as outputs of the electronic switches Q1-Q4 correspondingly. In other embodiments, the electronic switches Q1-Q4 may be PNP transistors or metal oxide semiconductor field effect transistors (MOSFETs). The gates of the MOSFETs function as the inputs of the electronic switches Q1-Q4 correspondingly. The drains of the electronic switches Q1-Q4 function as the outputs of the electronic switches Q1-Q4 correspondingly. The sources of the electronic switches Q1-Q4 are grounded.

During the POST of the computer, the detecting module 10 detects an operating status of the plurality of hardware devices H1-H8, and outputs state signals of each of the plurality of hardware devices H1-H8 according to the operating status of each of the plurality of hardware devices H1-H8 via the LPC bus. For example, the detecting module 10 may output a state signal "0" in response to the hardware device H1 being abnormal, and a state signal "1" in response to the hardware device H1 being normal. The state signals are received by the decoding module 20. The decoding module 20 decodes the state signals and outputs control signals according to the state signals to turn the electronic switches Q1-Q4 on or off correspondingly. The control signals are level voltage signals. For example, the electronic switch Q1 is turned on in response to receiving a high level voltage signal, such as about 5V from the decoding module 20, and is turned off in response to receiving a low level voltage signal, such as about 0V. The electronic switches Q1 and Q2 output high level voltage signals or low level voltage signals to the first and second inputs IN1a and IN1b of the dual color indicator D1 to switch the LEDs D1a and D1b on or off. The electronic switches Q3 and Q4 output high level voltage signals or low level voltage signals to the first and second inputs IN2a and IN2b of the dual color indicator D2 to switch the LEDs D2a and D2b on or off. Therefore, the indicating state of the indicating module 30 can be shifted between different combinations of the indicating states of the dual color indicators D1 and D2. The indicating state of each of the dual color indicators D1 and D2 is shifted between every two of a green light emission, a blue light emission, and no light emission as follows.

| Combinations | | Hardware device |
|---|---|---|
| States of indicator D1 | States of indicator D2 | information |
| green light emission | green light emission | H1 is abnormal |
| green light emission | blue light emission | H2 is abnormal |
| blue light emission | green light emission | H3 is abnormal |
| blue light emission | blue light emission | H4 is abnormal |
| green light emission | no light emission | H5 is abnormal |
| blue light emission | no light emission | H6 is abnormal |
| no light emission | green light emission | H7 is abnormal |
| no light emission | blue light emission | H8 is abnormal |

The relationship between the combinations and the information of the plurality of hardware devices H1-H8 are pre-programmed in the decoding module 20. For example, if the hardware device H1 is abnormal, the decoding module 20 receives a state signal "0," the decoding module 20 outputs a high level voltage signal, such as a 5V voltage signal to the base of each of the electronic switches Q1 and Q3, and a low level voltage signal, such as 0V to the base of each of the electronic switches Q2 and Q4. Therefore, both of the dual color indicators D1 and D2 emit green light to indicate that the hardware device H1 is abnormal.

If the hardware device H5 is abnormal, the decoding module 20 receives a state signal "0," the decoding module 20 outputs a high level voltage signal, such as 5V voltage signal to the base of the electronic switch Q1, and a low level signal, such as 0V to the base of each of the electronic switches Q2-Q4. Therefore, the dual color indicator D1 emits green light, while the dual color indicator D2 emits no light because both of the LEDs D2a and D2b are off. Both of the dual color indicators D1 and D2 emit no light in response to all of the hardware devices H1-H8 being normal.

If a greater number of hardware devices to be monitored are detected by the detecting module 10, the decoding module 20 can be programmed to output level control signals at intervals to each of the electronic switches Q1-Q4 to cause blinking of the LEDs D1a, D1b, D2a or D2b. Different blink rates can be predetermined to indicate variety of operating statuses of the hardware devices.

When the computer finishes the POST, the detecting module 10 detects an operating status of the hard disk drive HDD to output hard disk drive state signals to the decoding module 20, and the power supply PWR directly outputs power supply state signals to the decoding module 20. The decoding module 20 runs a redirect command to decode the hard disk drive state signals and the power supply state signals and outputs control signals according to the hard disk drive state signals and the power supply state signals. The redirect command is pre-programmed in the decoding module 20. The electronic switches Q1-Q4 stay on or off by receiving the control signals from the decoding module 20 correspondingly. The electronic switches Q1 and Q2 output high level voltage signals or low level voltage signals to the first and second inputs IN1a and IN1b of the dual color indicator D1 to switch both of the LEDs D1a and D1b on or off. The electronic switches Q3 and Q4 output high level voltage signals or low level voltage signals to the first and second inputs IN2a and IN2b of the dual color indicator D2 to control states of the LEDs D2a and D2b. The indicating module 30 can be controlled by the decoding module 20 to indicate the operating status of the hard disk drive HDD and the power supply PWR by different combinations of the indicating states of the dual color indicators D1 and D2. For example, the dual color indicator D1 emits green light to indicate the hard disk drive HDD is normal and remains off to indicate the hard disk drive HDD is abnormal. The dual color indicator D2 emits green light to indicate the power supply PWR is normal and remains off to indicate the power supply PWR is abnormal.

Figure 2:
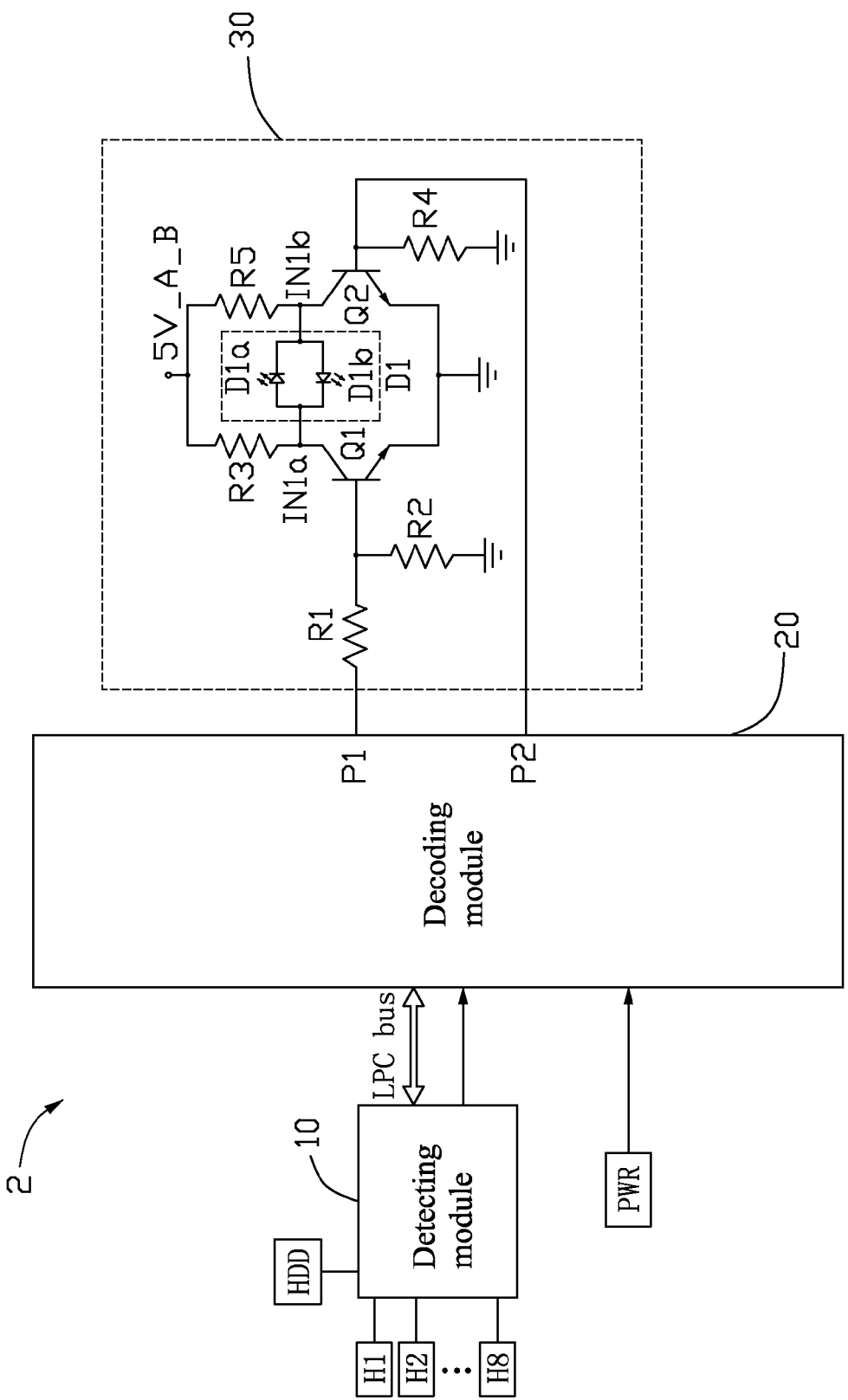
FIG. 2 is a circuit diagram of a second embodiment of a circuit for indicating status of computer hardware devices.

Referring to FIG. 2, a second embodiment of a circuit 2 without the dual color indicator D2 and the electronic switches Q3 and Q4 is used when fewer hardware devices will be present for detection by the detecting module 10. The lone dual color indicator D1 is controlled by the decoding module 20 to emit green or blue light, blink, or stay off to indicate operating status of the lesser number of the hardware devices during the POST and indicate the status of the hard disk drive HDD and the power supply PWR after the POST.

Figure 3:
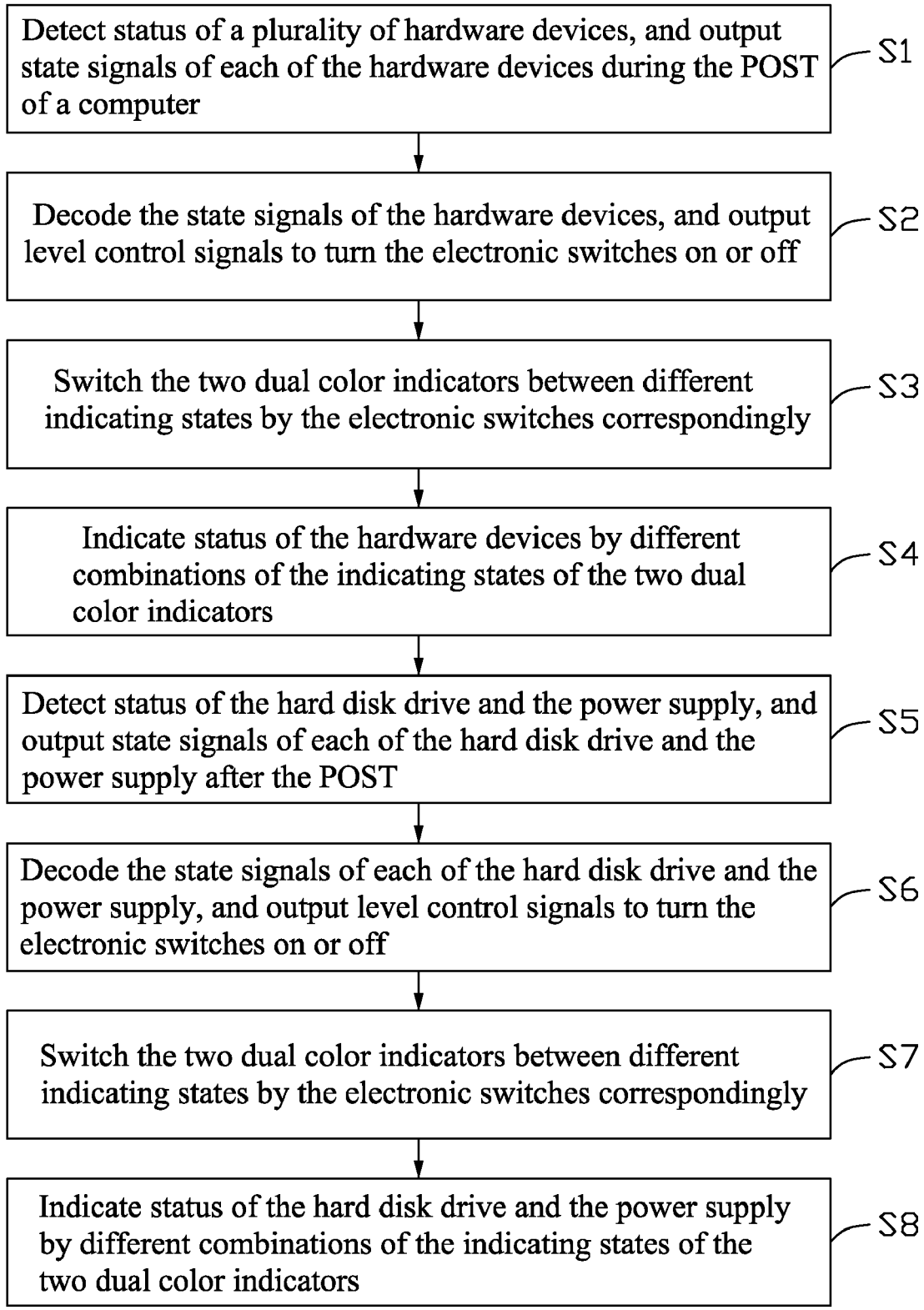
FIG. 3 is a flow chart of one embodiment of a method for indicating status of computer hardware devices.

Referring to FIG. 3, an embodiment of a method for indicating status of the plurality of hardware devices H1-H8, the hard disk drive HDD, and the power supply PWR of the computer includes the following steps.

In block S1, the detecting module 10 detects operating status of the plurality of hardware devices H1-H8 and outputs state signals of each of the hardware devices H1-H8 according to the operating status of each of the hardware devices H1-H8 during the POST of the computer.

In block S2, the decoding module 20 decodes the state signals of the plurality of hardware devices H1-H8 and outputs control signals to turn the electronic switches Q1-Q4 on or off.

In block S3, the electronic switches Q1-Q4 output high level voltage signals or low level voltage signals to shift each of the dual color indicators D1 and D2 between different indicating states, wherein the high level voltage signals and low level voltage signals of the electronic switches Q1-Q4 are configured to turn on or turn off the LEDs D1a and D1b of the dual color indicator D1, and the LEDs D2a and D2b of the dual color indicator D2.

In block S4, the indicating module 30 indicates operating status of the plurality of hardware devices H1-H8 by different combinations of the indicating states of the dual color indicators D1 and D2.

In block S5, the detecting module 10 detects operating status of the hard disk drive HDD and the power supply PWR and outputs state signals of each of the hard disk drive HDD and the power supply PWR after the POST of the computer.

In block S6, the decoding module 20 decodes the state signals of each of the hard disk drive HDD and the power supply PWR, and outputs control signals to turn the electronic switches Q1-Q4 on or off.

In block S7, the electronic switches Q1-Q4 output high level voltage signals or low level voltage signals to switch on or off the LEDs D1a and D1b of the dual color indicator D1, and D2a and D2b of the dual color indicator D2 correspondingly;

In block S8, the indicating module 30 indicates operating status of the hard disk drive HDD and the power supply PWR by different combinations of the indicating states of the dual color indicators D1 and D2.

The foregoing description of the exemplary embodiments of the disclosure has been presented only for the purposes of illustration and description and is not intended to be exhaustive or to limit the disclosure to the precise forms disclosed.

Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A circuit for indicating operating status of a plurality of hardware devices of a computer comprising:
    a detecting module configured to detect an operating status of each of the plurality of the hardware devices, and output state signals of each of the plurality of hardware devices during a power on self test (POST) of the computer;
    an indicating module comprising:
        at least one dual color indicator comprising a first input and a second input; and
        at least two electronic switches, each of the at least two electronic switches comprising an input, and an output connected to one of the first and second inputs of the at least one dual color indicator; and
    a decoding module configured to decode the state signals, and output control signals to the input of each of the at least two electronic switches;
    wherein the at least one dual color indicator is shifted between different indicating states to indicate operating status of the plurality of the hardware devices by turning on or off the at least two electronic switches by the received control signals.

2. The circuit of claim 1, wherein the detecting module is further connected to a hard disk drive of the computer, the decoding module is further connected to a power supply of the computer to receive power supply state signals from the power supply after the POST, wherein the detecting module detects operating status of the hard disk drive and outputs hard disk drive state signals to the decoding module after the POST, the decoding module decodes the hard disk drive state signals and the power supply state signals, and outputs control signals according to the hard disk drive state signals and the power supply state signals to shift the at least one dual color indicator between different indicating states to indicate operating status of the power supply and the hard disk drive.

3. The circuit of claim 2, wherein the control signals outputted by the decoding module are high level voltage signals or low level voltage signals.

4. The circuit of claim 3, wherein the high level voltage signals are about 5V and the low level voltage signals are about 0V.

5. The circuit of claim 1, wherein each of the at least one dual color indicator comprises a first light emitting diode (LED) and a second LED of a different color from the first LED, the anode of the first LED and the cathode of the second LED are connected to function as the first input of the dual color indicator, the cathode of the first LED and the anode of the second LED are connected to function as the second input of the dual color indicator, wherein the dual color indicator are shifted between the different indicating states by switching the first and second LEDs on or off by the at least two electronic switches correspondingly.

6. The circuit of claim 1, wherein the at least one dual color indicator comprises a first dual color indicator and a second dual color indicator, the at least two electronic switches comprising two first electronic switches connected to the first dual color indicator and two second electronic switches connected to the second dual color indicator.

7. The circuit of claim 1, wherein the at least one dual color indicator comprises one dual color indicator.

8. The circuit of claim 1, wherein each of the at least two electronic switches is a transistor comprising a base functioning as the input of the electronic switch, a collector functioning as the output of the electronic switch, and a grounded emitter.

9. The circuit of claim 1, wherein the detecting module is a south bridge chip of the computer.

10. The circuit of claim 1, wherein the decoding module is a complex programmable logic device.

11. The circuit of claim 1, wherein the decoding module is a micro controller unit.

12. The circuit of claim 1, wherein the decoding module is pre-programmed to decode the received states signals.

13. A method for indicating operating status of a plurality of hardware devices of a computer comprising:
    providing an indicating module comprising at least one dual color indicator that comprises a first input and a second input, and at least two electronic switches each comprising an input, and an output connected to one of the first and second inputs of the at least one dual color indicator;
    detecting operating status of each of the plurality of hardware devices, and outputting state signals of each of the plurality of hardware devices during a power on self test (POST) of the computer;
    decoding the state signals and outputting control signals according to the state signals to turn on or turn off the at least two electronic switches; and
    indicating operating status of the plurality of the hardware devices by shifting the at least one dual color indicator between different indicating states by the at least two electronic switches.

14. The method of claim 13, further comprising:
    detecting operating status of a hard disk drive and a power supply of the computer, and outputting state signals of each of the hard disk drive and the power supply after the POST;
    decoding the state signals of the hard disk drive and the power supply, and outputting control signals according to the state signals of the hard disk drive and the power supply to turn the at least two electronic switches on or off; and
    indicating operating status of the hard disk drive and the power supply by shifting the at least one dual color indicator between different indicating states by the at least two electronic switches.

15. The method of claim 14, wherein the indicating step comprises:
    providing the at least one dual color indicators with a first dual color indicator;
    providing the at least two electronic switches with two first electronic switches and two second electronic switches;
    shifting the first dual color indicator between the different indicating states by the two first electronic switches according to the received control signals; and
    shifting the second dual color indicator between the different indicating states by the two second electronic switches according to the received level control signals; and indicating operating status of the plurality of hardware devices by different combinations of the indicating states of the first and second dual color indicators.

16. The method of claim 14, wherein the at least one dual color indicator comprises a first light emitting diode (LED) and a second LED, the at least one dual color indicator is shifted by switching on or off the first LED and the second LED by the at least two electronic switches correspondingly, the first and second LEDs having different colors.

17. The method of claim 16, wherein the different indicating states of the at least one dual color indicator comprise emitting light by the first LED, emitting light by the second LED, no light emission, and blinking light emission by the first or second LEDs.

18. The method of claim 14, further comprising presetting a program to output the control signals according to the received state signals of the plurality of hardware devices, the hard disk drive and the power supply.

19. The method of claim 14, wherein the control signals outputted by the decoding module are high level voltage signals or low level voltage signals.

20. The method of claim 19, wherein the high level voltage signals are about 5V and the low level voltage signals are about 0V.

* * * * *